United States Patent
Littau

[15] 3,686,842
[45] Aug. 29, 1972

[54] RECIPROCATING BEATER MEANS FOR AGRICULTURAL ROW CROP HARVESTER

[72] Inventor: Eugene G. Littau, 942 Fir S., Salem, Oreg. 97302

[22] Filed: Jan. 14, 1971

[21] Appl. No.: 106,427

[52] U.S. Cl.....................................56/330
[51] Int. Cl. ................................A01g 19/00
[58] Field of Search ......56/330, 328, 29; 1/107, 108, 1/118

[56] References Cited

UNITED STATES PATENTS

| 266,302 | 10/1882 | Mote............................56/108 |
| 976,223 | 11/1910 | Small...........................56/108 |
| 3,203,159 | 8/1965 | Weygandt et al................56/1 |
| 3,344,591 | 10/1967 | Christie et al. ..............56/330 |
| 3,439,482 | 4/1969 | Orton..........................56/330 |

*Primary Examiner*—Russell R. Kinsey
*Attorney*—Kolisch & Hartwell

[57] ABSTRACT

An agricultural row crop harvester including a pair of spaced-apart, substantially parallel elongated cylindrical beater elements which are inclined relative to the horizontal and which are adapted to straddle plants in a row during a harvesting operation. Such elements are reciprocated as a unit under power to strike alternately opposite sides of stems in a plant, to dislodge produce from the plant by a sort of whiplash action produced in such stems.

10 Claims, 5 Drawing Figures

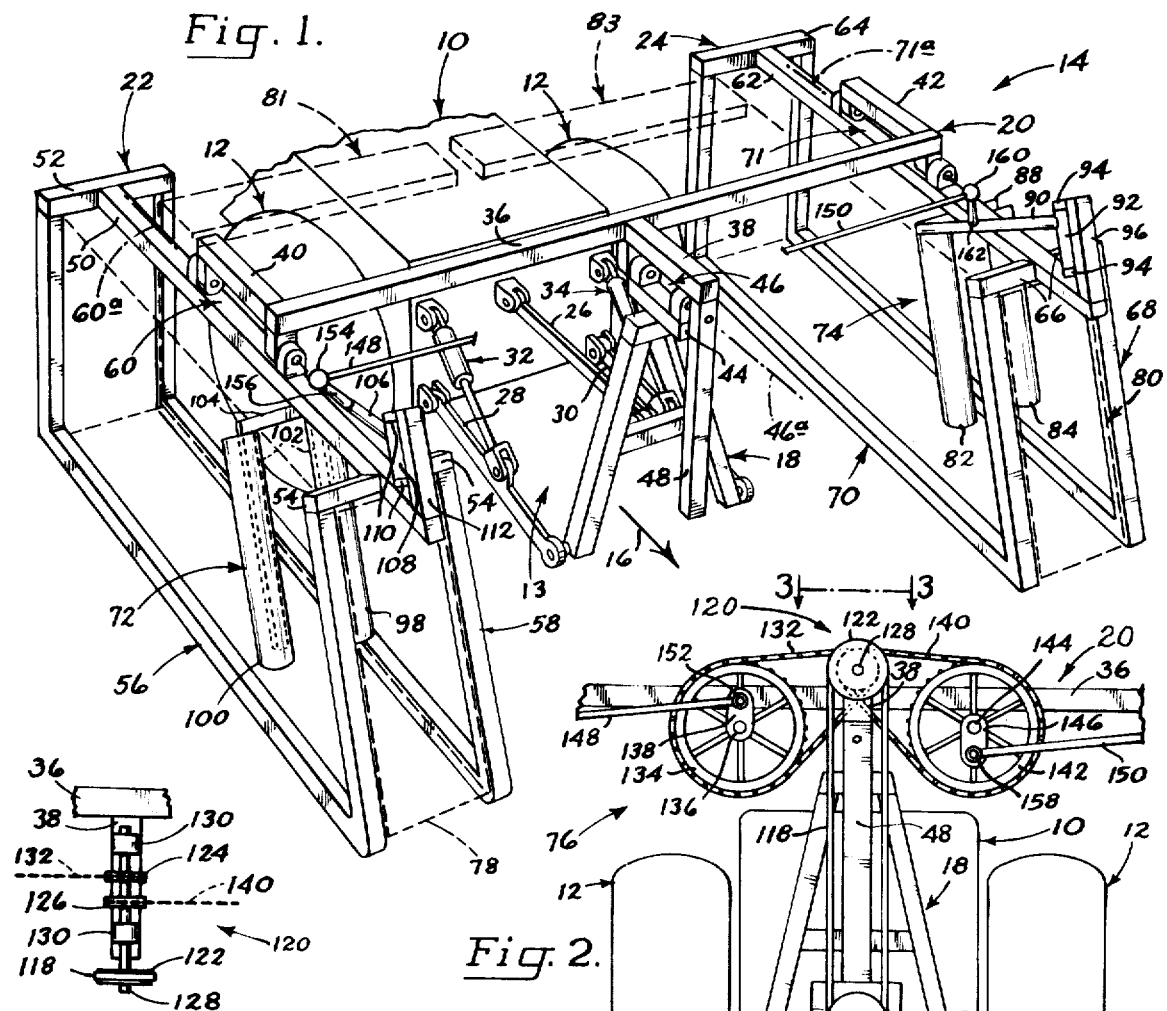
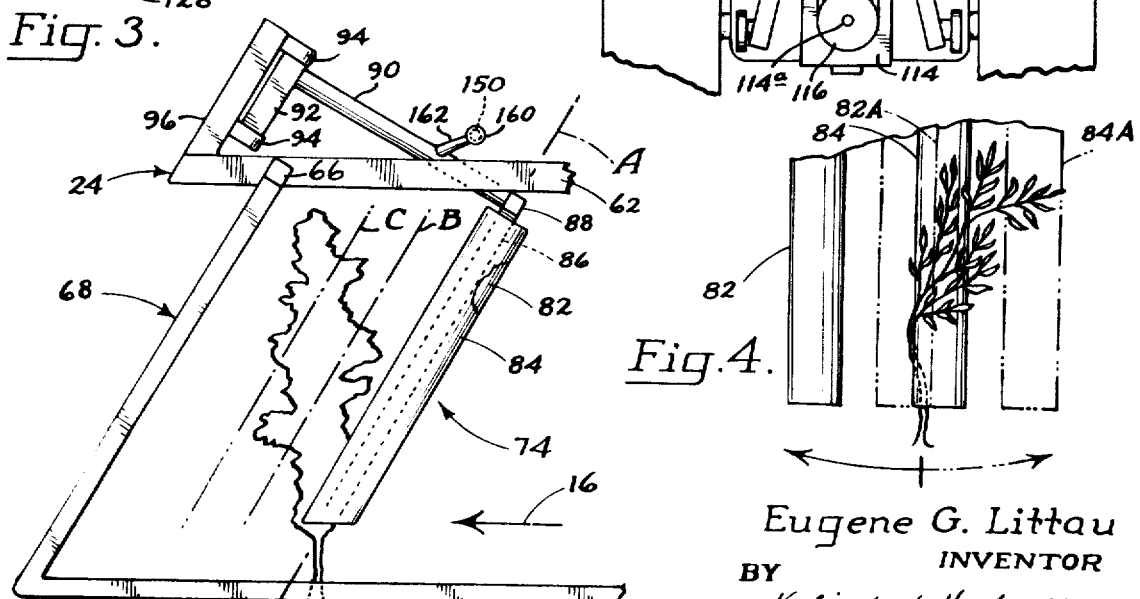
Eugene G. Littau
INVENTOR
BY Kolisch & Hartwell
Attys.

RECIPROCATING BEATER MEANS FOR AGRICULTURAL ROW CROP HARVESTER

BACKGROUND AND SUMMARY OF THE INVENTION

This invention pertains to an agricultural row crop harvester, and more particularly to beater means for use in such a harvester for dislodging produce from plants in a row. For the purpose of illustration herein, a preferred embodiment of the invention is described in connection with harvesting berry fruits, such as black raspberries, where it has been found to have particular utility.

In recent years, there has been a growing interest in the development and use of automated agricultural equipment. Included in the subjects of this interest has been machinery for harvesting row crop produce, such as black raspberries.

If the machine-harvesting of such a crop is to be satisfactory, a number of considerations must be taken into account. To begin with, a machine for such a purpose must obviously be reasonably economic and efficient. For example, it should be capable of performing rapidly in a field, with minimal manual interference required, and should be constructed to remove from plants as high a percentage as possible of ripe fruit. Further, such a machine should produce as little damage as possible to plants. It should, in addition, be relatively simple to operate.

A general object of the present invention, therefore, is to provide a novel row crop harvester for harvesting produce, such as black raspberries, which takes the above-mentioned considerations into account in a practical and satisfactory manner.

More specifically, an object of the invention is to provide such a harvester which makes the machine-harvesting of row crop produce, such as that indicated, a relatively quick, simple, and economical operation.

A related object of the invention is thus to provide such a harvester which can move relatively quickly along rows of plants in a field, and at the same time remove, with minimal damage to plants, a very high percentage of ripe produce on the plants.

To accomplish these objects, the invention features a novel beater means which preferably takes the form of a pair of spaced-apart, substantially parallel elongated cylindrical elements. These elements are adapted to straddle a row of plants as the harvester moves therealong, and through reciprocating, to strike opposite sides of stems in the plants to produce a sort of whiplash action therein that dislodges produce. The elements preferably occupy generally upright planes, and are inclined upwardly and rearwardly relative to the direction that the harvester advances along a row during a harvesting operation.

As the elements alternately strike opposite sides of stems in a plant, the stems whip back and forth, bending around the elements, with the result that ripe produce is thrown laterally outwardly from a plant where it can conveniently be caught by suitable collecting apparatus. The cylindrical outside surfaces on the elements which engage the stems promote and accommodate such whipping action while holding plant damage to a minimum. With the elements inclined as described, as a harvester moves along a row of plants, each plant is struck by the elements a number of times, and at progressively higher elevations on the plant, to ensure thorough harvesting of produce from the plant.

The beater elements preferably are reciprocated under power continuously as the harvester moves along a row, and manual interference therewith is not required.

DESCRIPTION OF THE DRAWINGS

These and other objects and advantages attained by the invention will become more fully apparent as the following description is read in conjunction with the accompanying drawings, wherein:

FIG. 1 is a somewhat simplified perspective view, with certain parts omitted for the sake of clarity, illustrating an agricultural row crop harvester which incorporates beater means constructed according to the present invention;

FIG. 2 is a fragmentary front elevation of the harvester of FIG. 1, showing details of a power-operated drive mechanism in the beater means of the invention, which mechanism is among the parts mentioned above omitted from FIG. 1;

FIG. 3 is a fragmentary view taken along the line 3—3 in FIG. 2;

FIG. 4 is a simplified fragmentary front elevation which illustrates a pair of spaced-apart beater elements that are adapted to straddle plants in a row, and how such elements, through reciprocating, produce a whiplash-type action in the stems of a plant; and FIG. 5 is a fragmentary side elevation, taken generally from the right side of FIG. 1, further disclosing the beater means of the invention, and illustrating how beater elements therein engage a plant at progressively higher elevations thereon as the harvester advances along a row.

DETAILED DESCRIPTION OF THE INVENTION

Turning now to the drawings, and referring first to FIG. 1, indicated generally in fragmentary block form at 10 is a rear end portion of the frame of a conventional agricultural vehicle, such as the rear end frame portion of a tractor. In order to simplify the drawings, and because of the familiarity which those skilled in the art have with respect to the details of conventional tractor construction, no attempt has been made herein to illustrate details of the tractor and its frame. The rear end of frame 10 is supported for travel over the ground through the usual power-driven rear wheel assemblies, such as those shown at 12. Wheel assemblies 12 are nonsteerable—the tractor being turned, or steered, when desired, through turning of its front wheel assemblies (not illustrated) which are, of course, steerable.

Mounted on the rear end of frame 10 through a conventional three-point hitch mechanism indicated generally at 13 is an articulated frame structure 14 which is adapted to carry harvesting apparatus (including the beater means of the present invention) for harvesting ripe produce from upstanding row crop plants, such as from black raspberry plants. The combination of the tractor and articulated frame structure comprise a dual-row harvester herein for such a crop. During a harvesting operation, the tractor is driven in reverse, i.e., in the direction of arrow 16, between rows of plants. This travel direction for the tractor is, of course, not critical, but has been found to be convenient with the particular combination of tractor and articulated frame structure shown.

In general terms, frame structure 14 includes a centrally disposed vertically shiftable subframe 18, an elongated rock frame 20, and a pair of spaced-apart swingable outrigger frames 22, 24.

Subframe 18 has an A-shaped configuration, and is mounted for vertical movement on the rear end of tractor frame 10 through previously-mentioned hitch mechanism 13. This hitch mechanism is conventional, and comprises three elongated rigid links 26, 28, 30 which pivotally interconnect frame 10 and subframe 18. The links substantially parallel one another, and have their forward ends pivoted to the rear of frame 10 and their rear ends pivoted to the subframe. Operatively interposed between links 28, 30 and frame 10 are hydraulic rams 32, 34, respectively. The cylinders in these rams are connected to a suitable source of hydraulic fluid under pressure, such as the hydraulic fluid source normally provided on an agricultural tractor. Rams 32, 34 are connected for coordinated, likes, simultaneous operation. With extension thereof, the links in the hitch mechanism swing downwardly, with resultant lowering of subframe 18; and with contraction of the rams, the reverse action takes place.

Rock frame 20 comprises an elongated central member 36 to which are joined a central mounting part 38, and end members 40, 42. Central member 36 is substantially centered (laterally) relative to the longitudinal axis of the tractor frame, and extends toward and beyond laterally opposite sides of such frame (outwardly of wheel assemblies 12). The overall length of member 36 is substantially the same as what might be thought of as the mean, or normal, spacing of the rows of plants in the crop which is intended to be harvested. In the particular case illustrated herein, where the crop that is to be harvested comprises black raspberries, the rows of black raspberry plants have a mean (or normal) spacing of about 9 feet.

Mounting part 38 extends forwardly of central member 36, and is disposed with its longitudinal axis substantially paralleling the longitudinal axis of the tractor frame. The mounting part directly overlies a substantially parallel member 44 which is suitably joined to the top of subframe 18. The rock frame is pivoted to the subframe through a pivot assembly 46 which is interposed between member 44 and mounting part 38. Pivot assembly 46 accommodates rocking of frame 20 relative to subframe 18 about an axis 46a.

Suitably joined to the forward end of mounting part 38 is an elongated downwardly extending arm 48. This arm is disposed with its longitudinal axis at substantially a right angle to the axis of the mounting part. As will be more fully explained later, arm 48 is employed herein to support certain parts in a power-operated drive mechanism in the beater means of the invention.

End members 40, 42 in the rock frame are substantially the same in construction and project rearwardly of central member 36. Members 40, 42 are disposed with their longitudinal axes substantially paralleling that of mounting part 38.

Considering briefly the constructions of outrigger frames 22, 24, these are substantially identical. Considering frame 22, it comprises an elongated central top member 50, adjacent the rear end of which is joined a transversely extending member 52, and adjacent the front end of which are joined a pair of transversely extending axially aligned members 54. The longitudinal axes of members 52, 54 substantially parallel one another, and are disposed at substantially right angles to the longitudinal axis of member 50. Member 50 is disposed with its longitudinal axis substantially paralleling that of the tractor frame.

Joined to and depending from the outer opposite sets of ends of members 52, 54 are a pair of somewhat U-shaped parts 56, 58 which are substantially the same in construction.

Outrigger frame 22 is pivoted to end member 40 in rock frame 20 through a pivot assembly 60 which is similar to previously-mentioned pivot assembly 46. Assembly 60 accommodates swinging of frame 22 relative to frame 20 about an axis 60a which substantially parallels axis 46a.

As has already been mentioned, outrigger frame 24 is substantially the same in construction as frame 22. It includes members and parts 62, 64, 66, 68, 70 which correspond to members in parts 50, 52, 54, 56, 58, respectively, in frame 22. Frame 24 is pivoted to end member 42 in the rock frame through a pivot assembly 71 which corresponds to pivot assembly 60. Pivot assembly 71 accommodates swinging of frame 24 relative to frame 20 about an axis 71a which substantially parallels axes 46a, 60a.

Generally speaking, and as the tractor moves along and between a pair of rows during a harvesting operation, frame 20 rocks when necessary to accommodate a condition with one of the rows at a higher elevation than the other row, and frames 22, 24, which straddle the rows (and carry plant-engaging and fruit collecting equipment) swing to accommodate irregular spacing between the rows. While this particular kind of frame structure has been selected for the purpose of disclosing the present invention, it is appreciated that various other kinds of frame structures, articulated or not, could be employed to support the apparatus of the invention.

Frame structure 14 herein supports various components of berry-harvesting apparatus, including the novel beater means of the present invention. Such beater means takes the form generally of a pair of beater assemblies 72, 74, mounted on outrigger frames 22, 24, respectively, and a power-operated drive mechanism, or means, 76 (for reciprocating beater elements in these assemblies) mounted on rock frame 20 and on arm 48 (see FIG. 2). In addition to carrying beater assemblies 72, 74, the outrigger frames (which straddle plants in a row during a harvesting operation) also carry other harvesting components, such as: side panels for the U-shaped parts (to capture fruit thrown outwardly from plants); conventional pivoted "fish-plates" or like apparatus for gathering fruit adjacent the bases of the swing frames where they straddle plants; and conveyer means for carrying away collected berries. These other harvesting components may take a number of different conventional forms and arrangements, none of which form part of the present invention. Thus, they are not illustrated in detail herein. Rather, such other components are represented simply in dashed block outlines, generally at 78, 80 in FIG. 1 on swing frames 22, 24, respectively. Indicated generally at 81, 83 also in simple dashed block outline, are conventional conveyer mechanisms which are for receiving berries from equipment on frames 22, 24, respectively, and for transporting such berries to a suitable receiving station on the frame of the tractor.

Considering now in detail the construction of the beater means contemplated herein, beater assemblies 72, 74 are essentially the same in construction. Thus, and considering assembly 74, in conjunction with FIGS. 1 and 5, it comprises a pair of elongated hollow cylindrical tubes, or beater elements, 82, 84. Preferably, the outside diameter of each tube is the same, and is sufficiently large (relative to the outside diameters of stems in the plants which are to be harvested) to provide a curved outside surface for the tube which, when thrust against a stem in a plant (as will be more fully explained) causes the stem to bend around it readily without breaking. An outside diameter for these tubes of about six inches has been found to be entirely satisfactory for use with plants such as black raspberry plants.

Tubes 82, 84 substantially parallel one another, and when viewed from a side of the harvester as in FIG. 5, are disposed at the angle shown relative to the ground. More specifically, the tubes slope upwardly and rearwardly in the harvester at an angle of about 60° to the horizontal. The confronting surfaces of the tubes herein are spaced apart by about 8 inches, with the tubes being fastened to a pair of elongated spaced-apart substantially parallel bars 86 whose upper ends are anchored to a cross bar 88. Bars 86 are disposed with their longitudinal axes substantially paralleling the axes of the tubes. The laterally innermost end of cross bar 88 (i.e., the end toward frame 10) is joined to one end of an elongated arm 90, the other end of which is joined to an inclined shaft 92. The longitudinal axis of arm 90 is disposed at substantially a right angle to the longitudinal axes of bars 86, and is disposed at an angle slightly less than 90° to the axis of cross bar 88. Further, the longitudinal axis of an arm 90 is disposed at substantially a right angle to the axis of shaft 92. Opposite ends of shaft 92 are journaled in bearings 94 for turning about its longitudinal axis; and bearings 94 are mounted on an inclined support member 96 which is joined to the top of member 62 in frame 24, adjacent the forward end of member 62. Shaft 92 and support member 96 are disposed with their longitudinal axes substantially paralleling those of tubes 82, 84.

It will be apparent that the mounting provided for tubes 82, 84, accommodates lateral (side-to-side) reciprocation of these tubes about the axis of shaft 92. With arm 90 joined to cross bar 88 adjacent the inner end thereof, and with the arm extending at the angle generally described relative to the cross bar, clearance is provided between the arm and top member 62 in frame 24 which accommodates such reciprocation.

Beater assembly 72 includes a pair of tubes 98, 100 corresponding to tubes 82, 84, respectively, bars 102, 104 corresponding to bars 86, 88, respectively, an arm 106 corresponding to arm 90, and a shaft, bearings and support member 108, 110, 112, corresponding to shaft 92, bearings 94 and support member 96, respectively.

Referring to FIGS. 1, 2 and 3 together, in the embodiment being described herein, drive mechanism 76 includes an engine 114 mounted adjacent the lower end of arm 48. Engine 114 may comprise any suitable form of gasoline or diesel powered engine. The output shaft 114a of the engine carries a pulley 116 which is connected through a belt 118 to a pulley-sprocket assembly 120 mounted on mounting part 38 in rock frame 20. More specifically, belt 118 is trained around a pulley 122 in assembly 120, such assembly also including a pair of sprockets 124, 126. Pulley 122 and sprockets 124, 126 are anchored to a common shaft 128 which is journaled in bearings 130 mounted on part 38.

Trained around sprocket 124 is a chain 132 which is also trained around a somewhat larger diameter sprocket 134. Sprocket 134 is secured to a shaft 136 suitably journaled on member 36 in the rock frame, to the left of mounting part 38 in FIG. 2. Also secured to shaft 136 is a crank 138. Shaft 136, crank 138 and sprocket 134 turn as a unit about the axis of shaft 136. Similarly, a chain 140 trained around sprocket 126 drivingly connects this sprocket with a sprocket 142 which is substantially the same in construction as sprocket 134. Sprocket 142 is anchored to a shaft 144 which is suitably journaled on member 36 in the rock frame, to the right of mounting part 38 in FIG. 2. Shaft 144 carries a crank 146 which is similar to crank 138. It will be noted that the angular disposition of crank 146 on shaft 144 is 180° different from the angular disposition of crank 138 on shaft 136. The reason for this will be explained later. The axes of shafts 128, 136, 144 all substantially parallel previously-mentioned axis 46a.

Interconnecting cranks 138, 146 and previously-described arms 106, 90, respectively, in beater assemblies 72, 74, respectively, are tie rods 148, 150, respectively. The inner end of rod 148 is connected through a ball-joint connection 152 to the outer end of crank 138, and the outer end of this rod is connected through a ball-joint connection 154 to a bracket 156 on arm 106. Similarly, the inner end of rod 150 is connected through a ball-joint connection 158 to the outer end of crank 146, and the outer end of the rod is connected through a ball-joint connection 160 to a bracket 162 which is mounted on arm 90. With sprockets 134, 142 and cranks 138 146 in the positions shown in FIG. 2, ball-joint connections 154, 160 are substantially centered on previously-mentioned axes 60a, 71a. Such is also true with these sprockets and cranks rotated 180° from the positions shown for them in FIG. 2.

Explaining now how the beater means described herein performs during a harvesting operation, with operation of engine 114, it will be apparent that the beater elements in assemblies 72, 74 reciprocate laterally. Although the exact throw, or stroke, produced in these elements is a matter of choice, a stroke of about 10 inches occurs in the apparatus described herein, such a stroke having been found through experimentation to be quite satisfactory with plants of the type mentioned earlier. Because of the relative angular dispositions described between cranks 138, 146, the reciprocal movements produced in the two sets of beater elements are substantially 180° out-of-phase with one another, and therefore create minimal vibration in the apparatus.

As the harvester advances along a pair of rows in a field, with the generally upright zones occupied by such rows straddled by the outrigger frames, the outside curved surfaces of the beater elements alternately strike opposite sides of stems in the plants in the rows, producing a sort of whiplash action in the stems which causes ripe fruit to be thrown outwardly from the plants. This kind of action is illustrated in FIG. 4 in the drawings where beater elements 82, 84 are illustrated in solid outline at one end of a stroke, and in dash double-dot outline (82A, 84A) at the other end of a stroke. In addition, there is shown a portion of a plant, and how such when struck by the beater elements, bends or whips around these elements to cause fruit to be thrown away from the plants.

Even though the beater elements strike stems with a considerable amount of force, the relatively large diameters of their outside surfaces minimizes damage to the plants while assuring an adequate whiplash-type action to promote thorough removal of ripe fruit. The frequency of reciprocation is a matter of choice.

Referring to FIG. 5 in the drawings, because of the inclined dispositions of the beater elements, as the harvester advances along a row, it will be noted that these elements engage a plant at progressively higher elevations thereon—such action also contributing to thorough removal of ripe fruit. With the harvester in the position illustrated in this figure relative to the plant shown, and with beater elements 82, 84 occupying inclined plane A, the elements strike low stems in the plant. When the harvester has advanced somewhat (to the left in FIG. 5) with the beater elements occupying inclined plane B, the elements strike intermediate stems in the plant. And, when the harvester has advanced still further, with elements 82, 84 occupying inclined plane C, the elements strike upper stems in the plant.

The novel beater means illustrated and described herein thus takes care of the considerations described earlier as being important in the proper performance of a row crop harvester for berry plants and the like.

While a preferred embodiment of the invention has been described herein, it is appreciated that variations and modifications may be made without departing from the spirit thereof.

It is claimed and desired to secure by letters patent:

1. Beater means for an agricultural row crop harvester having a frame structure, said beater means comprising an elongated beater element having a curved outside surface extending along at least one of its sides, and mounting means for said element adapted to mount the same on said frame structure in an attitude with the longitudinal axis of the element inclined relative to the horizontal, and for alternating movement of the element on the frame structure toward and away from plants in a row during a harvesting operation to strike stems in such plants with said surface.

2. Beater means for an agricultural row crop harvester having a frame structure, said beater means comprising an elongated cylindrical beater element, and mounting means for said element adapted to mount the same on said frame structure in an attitude with the longitudinal axis of the element inclined relative to the horizontal, and for alternating movement of the element of the frame structure toward and away from plants in a row during a harvesting operation to strike stems in such plants.

3. Beater means for an agricultural row crop harvester where the harvester has a frame portion which, with travel of the harvester along a row of plants during a harvesting operation, is adapted to move adjacent the generally upright zone occupied by such plants, said beater means comprising
an elongated beater element having a curved outside surface extending along at least one of its sides, and
means for mounting said element on said frame portion for reciprocal movement, during such a harvesting operation, between one position with said one side facing and disposed to one side of such a zone, and another position with said one side within said sone,
said mounting means supporting said element with its longitudinal axis inclined relative to the horizontal.

4. In a ground-traveling agricultural row crop harvester having a frame portion adapted, with travel of the harvester along a row of plants during a harvesting operation, to move along and adjacent the generally upright, elongated zone occupied by the plants in such a row,
beater means for striking stems in such plants to dislodge produce therefrom comprising
a pair of elongated, spaced-apart substantially parallel beater elements,
mounting means mounting said elements on said frame portion for reciprocation as a unit generally transversely of the direction that said harvester travels during a harvesting operation, with said elements occupying generally upright planes adapted to straddle the zone occupied by plants in a row, and
power-operated means operatively connected to said elements for reciprocating the same, with the elements on reciprocating moving alternatively into and out of such a zone, with each element on moving out of the zone toward a different side thereof.

5. The harvester of claim 4, wherein said elements are inclined relative to the horizontal.

6. The harvester of claim 5, wherein said elements slope upwardly progressing rearwardly therealong relative to the direction that the harvester advances along a row during a harvesting operation.

7. The harvester of claim 6, wherein said elements have cylindrical outside surfaces.

8. The harvester of claim 4, wherein the sides of said elements which face each other have curved outside surfaces.

9. The harvester of claim 8, wherein said elements are inclined relative to the horizontal.

10. The harvester of claim 9, wherein said elements slope upwardly progressing rearwardly therealong relative to the direction that the harvester advances along a row during a harvesting operation.

* * * * *

UNITED STATES PATENT OFFICE
CERTIFICATE OF CORRECTION

Patent No. 3,686,842          Dated August 29, 1972

Inventor(s) Eugene G. Littau

It is certified that error appears in the above-identified patent and that said Letters Patent are hereby corrected as shown below:

Claim 2, column 8, line 2, "of" should read --on--.

Claim 3, column 8, line 19, "sone" should read --zone--.

Claim 4, column 8, line 43, after "zone" insert --moving--.

Signed and sealed this 30th day of April 1974.

(SEAL)
Attest:

EDWARD M. FLETCHER, JR.
Attesting Officer

C. MARSHALL DANN
Commissioner of Patents